Patented Dec. 16, 1952

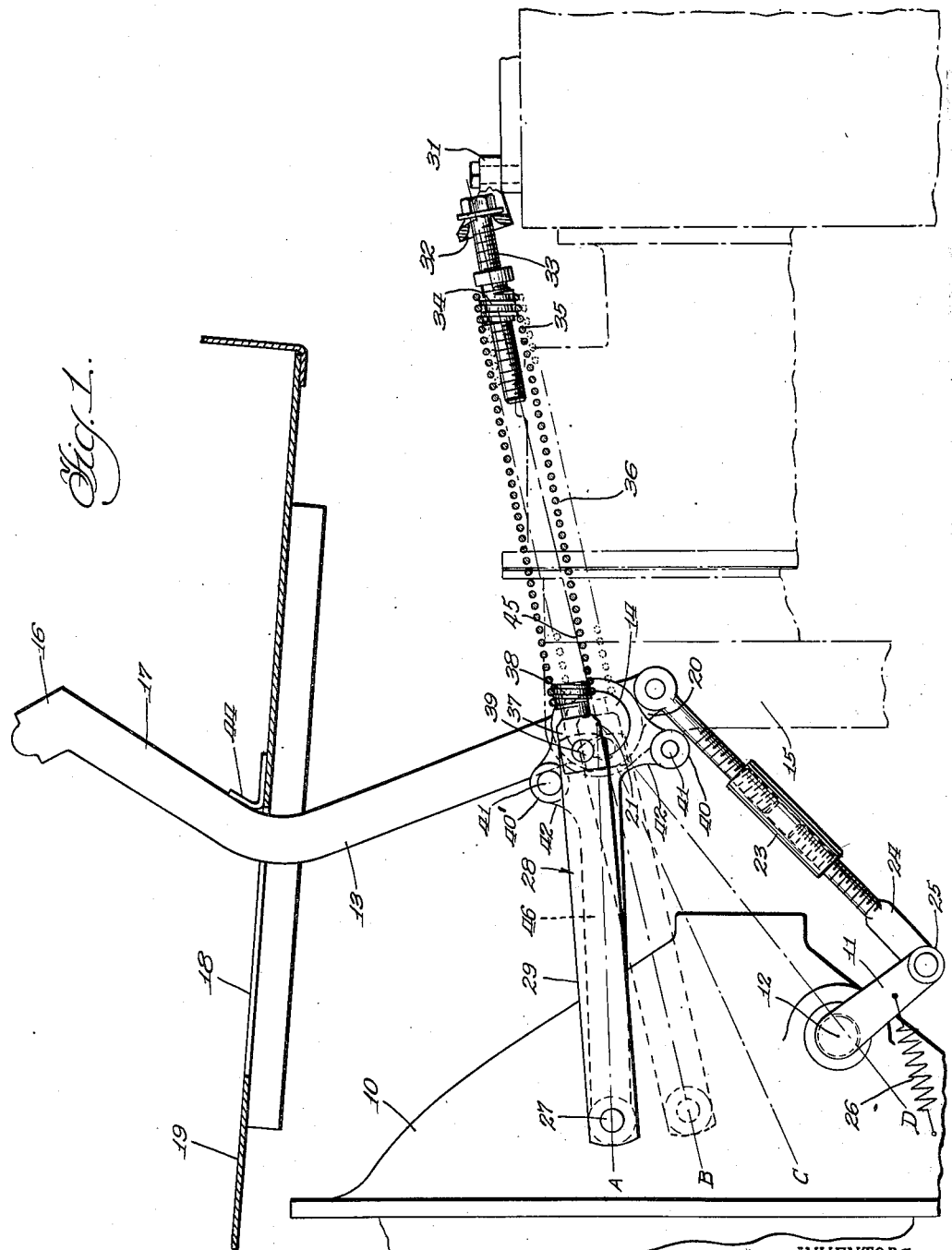

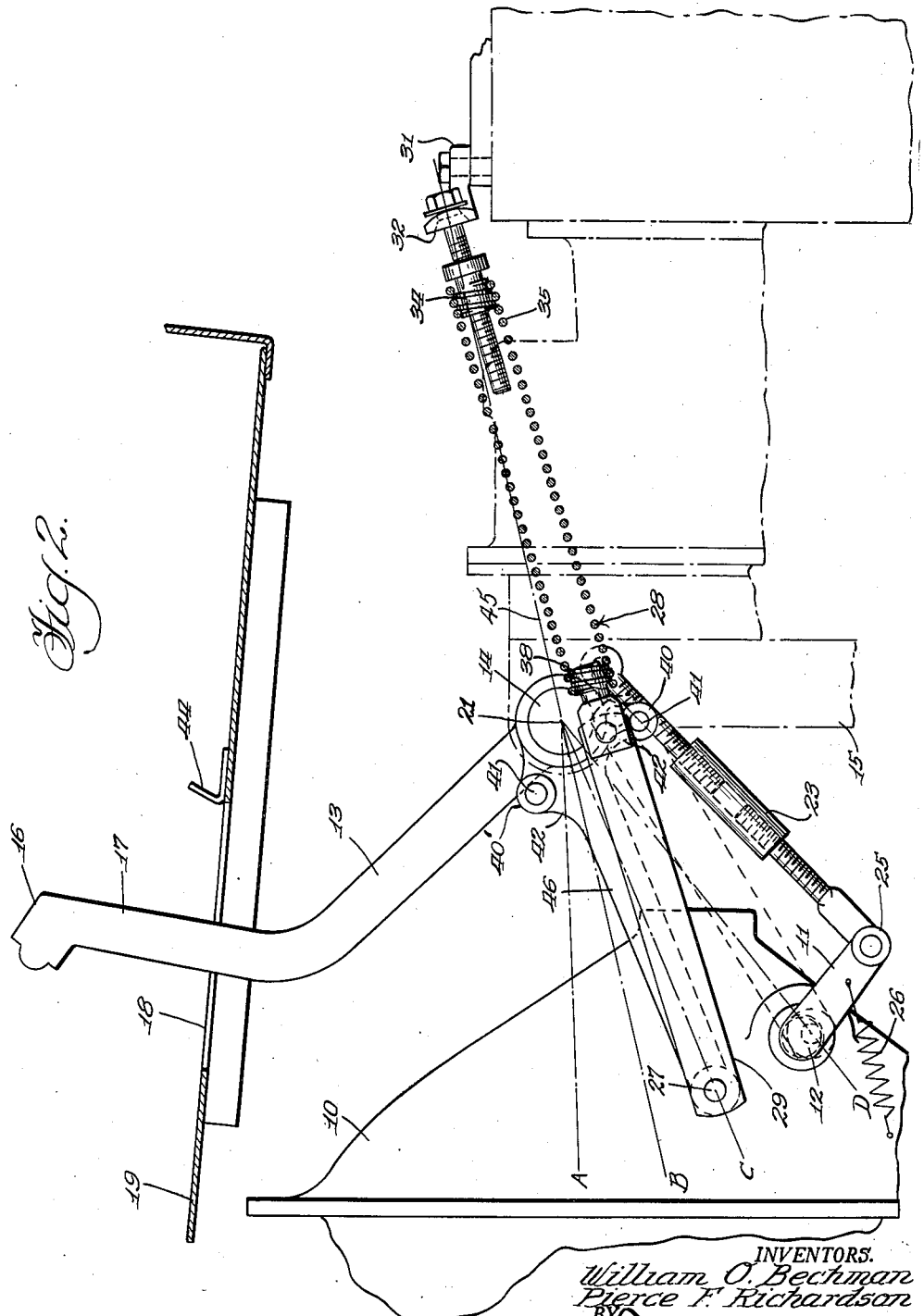

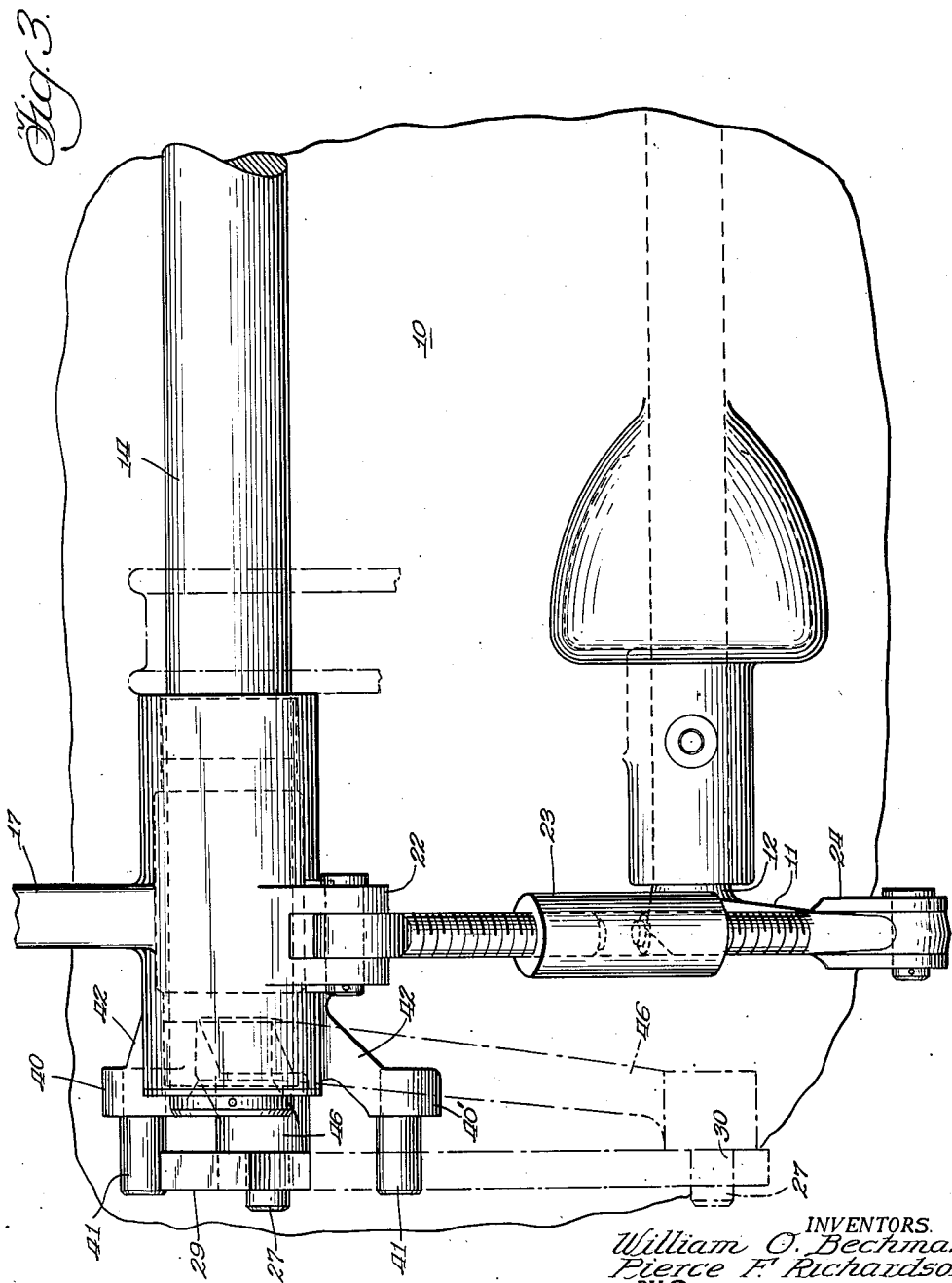

2,621,538

UNITED STATES PATENT OFFICE 2,621,538

CLUTCH ACTUATING DEVICE

William O. Bechman, Chicago, and Pierce F. Richardson, Downers Grove, Ill., assignors to International Harvester Company, a corporation of New Jersey Application December 6, 1949, Serial No. 131,404

8 Claims. (Cl. 74—512)

This invention relates to an improved clutch actuating device of the type used in engine-driven vehicles and more particularly to a device for assisting the vehicle operator in rocking or rotating the clutch actuating lever to a clutch disengaged position.

Vehicles such as farm or industrial tractors generally employ a friction clutch interposed between the vehicle power source or engine and the vehicle driving wheels for transmitting the torque developed by the engine to the wheels. Normally the friction clutch used has a driving clutch member held against a driven clutch member with substantial pressure when the clutch is in the engaged position. The pressure is obtained from resilient means such as clutch packing springs or the like. Inasmuch as the torque transmitted is considerable, it is readily apparent that springs having a very high compression strength must be employed to obtain sufficient pressure between the two clutch members to prevent slippage between the clutch members which is undesirable. Obviously, the greater the compression strength of the springs the more effective the clutch is for transmitting torque. In order to disengage the clutch the biasing action of the resilient means and accordingly the pressure of one clutch member on the other must be overcome by foot pressure of the vehicle operator or other means. Hence, the magnitude of biasing action of the resilient means is limited by the minimum force with which it is desired to have the clutch actuating mechanism respond to in order to disengage the clutch.

Many devices have been contrived to allow the employment of resilient means of great magnitude and still permit the vehicle operator to easily and conveniently overcome biasing action of the resilient means. The most frequently used device is an over-center spring mechanism which briefly stated is a tension spring having one end pivotally attached to a pivotally mounted clutch actuating lever and having its other end pivotally attached to a fixed support. The spring is adapted to operate over a center line through the rotational axis of the lever and the pivotal attachment of the spring to the support, whereby the spring causes a turning moment on the lever in the direction of the clutch disengaged position when on one side of the center line in opposition to the turning moment on the lever caused by the resilient means or clutch packing springs. It will be appreciated that the turning moment is a product of the tension force developed by the spring multiplied by the effective moment arm which is the length of the line perpendicular to the rotational axis of the lever and perpendicular to the direction of the tension force. It is evident, therefore, that the typical over-center spring device becomes increasingly more effective as the clutch lever is moved further and further toward its fully moved or clutch disengaged position since the effective moment arm becomes greater.

Inasmuch as the typical over-center spring mechanism becomes increasingly more effective as the clutch lever is moved towards its disengaged position, a certain undesirable feature is inherent in these prior art mechanisms. The turning moment applied to the lever by the mechanism must not reach a value greater than the biasing action of the resilient means when the lever is in the clutch disengaged position, since if it did the lever would not return to its engaged position after the foot pressure of the vehicle operator was removed. Thus in these prior art mechanisms for a given biasing action developed by the resilient means the magnitude of the over-center spring is limited.

The primary object of the present invention is to provide an improved clutch disengaging assisting mechanism.

Another object is to provide a clutch disengaging assisting mechanism employing the over-center spring principle but in which heavier tension springs may be used than employed in the prior art.

A further object is the provision of a resilient articulated structure and a pair of stops limiting and controlling the magnitude of the effective moment arm.

A further object is the provision of a biasing articulated structure to assist movement of a rotatable lever from one position to another.

A still further object is to provide a clutch disengaging assisting device which functions most effectively in the range where assistance is needed the most.

The foregoing and other important objects and desirable features inherent in and encompassed by the invention together with many of the purposes and uses thereof will become readily apparent from the ensuing description in conjunction with the annexed drawings, in which:

Fig. 1 is a side elevational view of a preferred form of the invention and showing the clutch actuating lever in the clutch engaged position.

Fig. 2 is a view similar to that of Fig. 1 but showing the clutch actuating lever in the clutch disengaged position.

Fig. 3 is a plan view of a portion of the invention.

Referring to the drawings in which the reference characters designate the same respective elements throughout the various views, a clutch housing 10 is illustrated which encloses a friction clutch (not shown) of the type used in automotive vehicles. The typical friction clutch employed generally comprises a driven member and a driving member spring-pressed into engagement with each other for transmitting the torque developed by the vehicle engine to the vehicle transmission and eventually to the traction elements of the vehicle. Generally, coil springs such as clutch packing springs are used to normally retain the clutch in engaged position and it is desirable to employ springs of substantial compressive strength so as to prevent slippage between driving and driven members. Inasmuch as the clutch per se forms no part of the present invention, no attempt will be made to describe it fully. However, it is to be understood that a clutch fork or other means is actuated by counter-clockwise rotation as viewed in Fig. 1 of arm 11 keyed to a shaft 12 journaled in the clutch housing 10 to disengage one clutch member from the other. The coil springs or other resilient means are diagrammatically represented by a spring 26 continually urging arm 11 clockwise to the clutch engaged position.

A clutch actuating lever 13 is keyed or otherwise suitably secured to a shaft 14 rotatably journaled in a support 15 mounted on the vehicle and is adapted to be rotated or rocked from the clutch engaged position shown in Fig. 1 to a clutch disengaged position shown in Fig. 2. Lever 13 has a pad 16 on a portion 17 projecting through a slot 18 formed in a floor plate 19 to accommodate the foot of the vehicle operator. An arm 20 projects downwardly from the rotational axis 21 of the lever 13 and is provided with a bifurcated portion 22 to pivotally receive one end of an adjustable link 23. Link 23 has its other end 24 pivotally connected in a bifurcated portion 25 of arm 11. It will be apparent that upon depression or rotation of lever 13 by the vehicle operator from the position shown in Fig. 1 to that shown in Fig. 2 the clutch will become disengaged.

In view of the fact that it is desirable to be able to transmit a magnitude of torque as great as possible without slippage of the clutch parts and since the maximum torque that can be transmitted is determined by the effective frictional area of the clutch members and the magnitude of spring-force urging the members into frictional engagement, it will be apparent that by employing springs having a comparatively high compressive strength a reduction of the effective frictional area of the members resulting in smaller clutches for the transmission of a given torque will be possible. Hence, it will be evident that the utilization of a smaller clutch results in a saving of materials and space within the vehicle. It is equally apparent that the vehicle operator must exert a greater foot pressure to overcome the heavier springs in order to disengage the clutch.

Rigidly attached to or forming a portion of the lever 13 is an arm 46 projecting forwardly and upwardly from the rotational axis 21 of the lever 13 viewed in Fig. 1. The arm 46 is adapted to move from position A of Fig. 2 to position D of the same figure when the lever 13 is moved from its clutch engaged position to its clutch disengaged position. The outer extremity of arm 46 is provided with a pin 27. Positioned adjacent the arm 46 and the lever 13 is a biasing articulated structure designated generally 28. The biasing articulated structure 28 includes a link 29 having an aperture 30 at one end adapted to fit over the pin 27 to provide a pivotal connection between the arm 46 and one end of the articulated structure 28. Secured rearwardly of the rotational axis 21 (as viewed in Fig. 1) on the support 15 is a bracket 31 having an opening 32 adapted to pivotally accommodate a rod member 33. One end of rod 33 has a threaded portion 34 adapted to engage the coils 35 at one end of the helical spring 36. The opposite end of spring 36 is provided with a bifurcated connecting member 37 having a threaded portion 38 cooperable with the coils at the other end of the spring 36. It will be apparent that the tensile strength of the spring 36 can be varied by rotation of rod member 33. One end of link 29 is received in the bifurcated connecting member 37 and is pivotally held in position by a pin 39. It will be noted that the pivotal connection of the link 29 and the spring 36 is in the vicinity of the pivotal connection of the lever 13 on the support 15 for a purpose which will hereinafter be explained.

Disposed on each side of the link 29 in the vicinity of the rotational axis 21 of the lever 13 are a pair of stops 40 and 40'. The stops 40, 40' comprise a pair of pins 41 horizontally mounted in portions 42 projecting from the arm 46 adjacent the rotational axis 21 of the lever 13. It will be appreciated that the stops are movable with the lever 13.

To fully understand the advantages of the device it is thought desirable to explain its operation from a clutch fully engaged position to a clutch fully disengaged position. Referring to Figs. 1 and 2, there are shown a series of lines designated by the letters A, B, C, and D radiating from the rotational axis 21 of the lever 13, which lines represent successive positions taken by the arm 46 during the rotational movement of the lever 13 from the clutch engaged to the clutch disengaged position. Movement of the lever 13 also will cause the articulated structure 28 to move arcuately about the pivotal connection of the spring 36 to the bracket 31.

In position A, corresponding to the clutch fully engaged position, portion 17 of lever 13 abuts a stop 44 projecting from the floor board 19 at one end of slot 18 to limit the movement of the lever in one direction. At this time, as well as during movement of the lever 13 through the successive positions B, C, and D, the resilient means 26 develops a turning moment on the lever 13 in a direction toward position A or the clutch fully engaged position. The biasing action of the articulated structure 28 also tends to urge lever 13 to the clutch fully engaged position when the elements of the device are disposed as shown in position A since the direction of the exertion or tension force of the spring 36 is above a center-line 45 drawn through the rotational axis 21 and pivotal connection of the spring 36 to the bracket 31.

Referring to position B which is reached by depressing or rotating lever 13 with foot pressure to overcome the combined turning moments of the springs 26 and 36, the turning moment developed by spring 36 becomes zero since the effective moment arm is zero. In this position the articulated structure 28 lies on the center line 45.

Line C represents the position taken by the arm 20 when the lower stop 40 first makes contact with link 29. At this position the turning moment developed by the spring 26 has increased over the value when in position A since the spring becomes elongated. The turning moment developed by the articulated structure 28 is increased from zero at position B to its maximum value at position C in a direction opposite to that of spring 26 since the articulated structure 28 is below the center line 45. It will be evident the turning moment developed by the articulated structure at any time will be the spring force of spring 36 multiplied by the effective moment arm. Therefore, the magnitude of the turning moment will be limited by maintaining the length of the effective moment arm within certain values. Stops 40 and 40' are provided as hereinbefore stated to accomplish this function. Stops 40, 40' being located in the path of movement of the articulated structure limit the movement of the articulated structure 28 and thus limit the length of the line perpendicular to the rotational axis 21 and perpendicular to the direction of the exertion or tension force of the spring 36 hereinbefore defined as the effective moment arm. It will be noted that although spring 36 is limited in its arcuate movement, link 29 may arcuately move independently beyond the movement of the spring 36 by pivoting about stops 40, 40'. The lower stop 40 acts as a pivot point for link 29 to allow the outer extremity of the link to move with arm 46 to line D. The turning moment developed by the articulated structure 28 remains practically constant from line C to D since the effective moment arm is substantially the same in both positions. Spring 36 may elongate slightly while going from line C to D but for all practical purposes, the turning moment will remain constant.

It will be understood that the turning moment developed by spring 26 at position D will be great enough to overcome the turning moment developed by spring 36 so that when the operator releases the lever 13 the lever and its associated parts will return to the clutch fully engaged position (position A).

The obvious advantage of the present invention is the possibility of employing an extremely heavy assisting spring to develop a high turning moment from position B to position C after which the turning moment is held constant. The lever 13 when in the position corresponding to line C may be easily depressed by the vehicle operator since the operator's leg is more nearly straight and therefore capable of applying more pressure compared with his ability to do so at position B. Furthermore, the upper stop 40' limits the turning moment caused by the spring 36 tending to urge the lever 13 to the clutch engaged position so that the initial foot pressure exerted by the vehicle operator to move the arm 20 from line A to B will be only slightly more than the force needed to overcome the turning moment developed by the spring 26 acting independently.

The embodiment of the invention shown for the purpose of illustration and description herein is that preferred as a result of selective tests based upon requirements for achieving the objects of the invention and to show the utility thereof in the most desirable manner, due regard being had to existing factors of economy, simplicity of design and construction, production methods and the improvements shown to be effected. It will be appreciated therefore that the particular structural and functional aspects emphasized herein are not intended to exclude but rather to suggest such other adaptations and modifications of the invention as fall within the spirit and scope of the invention as defined in the appended claims.

What is claimed is:

1. For use with a clutch having resilient means normally maintaining the clutch in an engaged position, the combination comprising a fixed support; a clutch actuating lever rotatably mounted on a pivot fixed on said support, said lever being rotatable from a clutch engaged position to a clutch disengaged position; means connecting said lever with said clutch; an arm rigidly attached to said lever and projecting forwardly of the rotational axis of said lever; a device arranged to assist said lever in disengaging said clutch including a biasing articulated structure having one end pivotally connected to said arm and having its other end pivotally connected to said fixed support rearwardly of said rotational axis, said articulated structure comprising a link pivotally connected to a tension spring adjacent said rotational axis whereby rotation of said lever causes arcuate movement of said articulated structure about its pivotal connection to said support, said articulated structure being so disposed as to arcuately move over a centerline through said rotational axis and said pivotal connection to said support whereby said articulated structure urges said lever to said clutch engaged position on one side of said centerline and urges said lever to said clutch disengaged position when on the opposite side of said centerline; and means adjacent said rotational axis and disposed on each side of said centerline to limit the arcuate movement of a portion of said articulated structure when said lever is rotated including a pair of stops projecting in the arcuate path of movement of said portion, said stops being spaced between the pivotal connection of said articulated structure to said arm and the pivotal connection of said link to said tension spring.

2. For use with a clutch having resilient means normally maintaining the clutch in an engaged position, the combination comprising a fixed support; a clutch actuating lever rotatably mounted on a pivot fixed on said support; means connecting said lever with said clutch, said lever being rotatable from a clutch engaged position to a clutch disengaged position; an arm rigidly attached to said lever and projecting upwardly and forwardly of the rotational axis of said lever when said clutch is in the clutch engaged position; a device arranged to assist said lever in disengaging said clutch including a biasing articulated structure having one end pivotally connected to said fixed support rearwardly of said rotational axis and having its other end pivotally connected to said arm, said articulated structure comprising a link pivotally connected to a tension spring adjacent said rotational axis whereby rotation of said lever causes arcuate movement of said articulated structure about its pivotal connection to said support, said articulated structure being so disposed as to arcuately move over a center line through said rotational axis and said pivotal connection to said support whereby said articulated structure urges said lever to said clutch engaged position on one side of said center line and urges said lever to said clutch disengaged position when on the opposite side of said center line; and means to limit the arcuate movement of said spring comprising a pin projecting from said arm on each side of said articulated structure, said pins being spaced between the pivotal connection of said link to said tension spring and the pivotal connection of said articulated structure to said arm.

3. For use with a clutch having resilient means normally maintaining the clutch in an engaged position, the combination comprising a fixed support; a clutch lever rotatably mounted on a pivot fixed on said support; means connecting said lever with said clutch, said lever being movable from a clutch engaged position to a clutch disengaged position against the action of said resilient means; a device arranged to assist said lever in disengaging said clutch comprising a biasing member pivotally connected to said lever forwardly of the pivotal point of connection of said lever to said support; means connecting said biasing member rearwardly of said pivotal connection of said lever to said fixed support, said biasing member being movable to a position wherein the points of connection of said biasing member are in longitudinal alignment whereby the biasing action of said member is substantially neutralized with respect to said lever, said biasing member being movable by said lever out of the longitudinally aligned position whereby said biasing member urges said lever to said clutch disengaged position; and stop means constructed and arranged to limit the movement of a portion of said biasing member from said longitudinally aligned position, said stop means being rigidly connected to said lever.

4. For use with a clutch having resilient means normally maintaining the clutch in an engaged position, the combination comprising a fixed support; a clutch actuating lever rotatably mounted on a pivot fixed on said support; means connecting said lever with said clutch, said lever being rotatable from a clutch engaged position to a clutch disengaged position; an arm rigidly attached to said lever and projecting forwardly of the rotational axis of said lever; a device arranged to assist said lever in disengaging said clutch including a biasing articulated structure having one end pivotally connected to said arm and having its other end pivotally connected to said fixed support rearwardly of said rotational axis of said lever whereby rotation of said lever causes movement of said articulated structure about its pivotal connection to said support, said articulated structure being so disposed as to move over a center line through said rotational axis and said pivotal connection to said support whereby said articulated structure urges said lever to said clutch engaged position on one side of said center line and urges said lever to said clutch disengaged position when on the opposite side of said centerline; and means adjacent said rotational axis and disposed on each side of said center line to limit the movement of a portion of said articulated structure when said lever is rotated, said means being rigidly fixed to said lever.

5. In a control for a clutch having resilient means normally maintaining the clutch in an engaged position, the combination comprising a fixed support; a clutch actuating lever rotatably mounted on a pivot fixed on said support; means connecting said lever with said clutch, said lever being rotatable against the action of said resilient means from a clutch engaged position to a clutch disengaged position; a device arranged to assist said lever in disengaging said clutch including a biasing articulated structure having one end pivotally connected to said lever forwardly of the rotational axis of said lever and the other end pivotally connected to said fixed support rearwardly of said rotational axis whereby rotation of said lever causes movement of said articulated structure about its pivotal connection to said support, said articulated structure tending to urge said lever to said clutch engaged position when on one side of a center line through said rotational axis and said pivotal connection to said support and to urge said lever to a clutch disengaged position on the other side; and means adjacent said rotational axis for limiting the movement of a portion of said articulated structure, said means being fixed to and movable with said lever.

6. In combination with a lever having resilient means normally maintaining it in a first position and being adapted for rotational movement upon a fixed pivot to a second position, a device arranged to assist said lever in movement from said first position to said second position including a biasing articulated structure comprising a link pivotally connected to said lever forwardly of the rotational axis of said lever and a tension spring pivotally connected to a fixed member rearwardly of said rotational axis, said link and spring being pivotally connected adjacent said rotational axis whereby movement of said lever causes said articulated structure to pass through a center line through said rotational axis and said pivotal connection to said fixed member to urge said lever to said first position on one side of said center line, and to urge said lever to said second position on the opposite side of said center line; and means adjacent said rotational axis and disposed on each side of said center line to limit the movement of said spring, said means being movable with said lever and being spaced between the pivotal connection of said link to said lever and the pivotal connection of said link to said tension spring.

7. In combination with a lever having resilient means normally maintaining it in a first position and being adapted for rotational movement upon a fixed pivot to a second position, a device arranged to assist said lever in movement from said first position to said second position including a biasing articulated structure having one end pivotally connected to said lever upwardly and forwardly of the rotational axis of said lever when said lever is in said first position and the other end pivotally connected to a fixed member rearwardly of said rotational axis whereby movement of said lever causes said articulated structure to pass through a center line through said rotational axis and said pivotal connection to said fixed member to urge said lever to said first position on one side of said center line and to urge said lever to said second position on the opposite side of said center line; and means adjacent said rotational axis and disposed on each side of said center line to limit the movement of a portion of said articulated structure, said means being fixed to said lever.

8. In combination with a lever having resilient means normally maintaining it in a first position and being adapted for rotational movement upon a fixed pivot to a second position, a device arranged to assist said lever in movement from said first position to said second position including a biasing articulated structure having a first end pivotally connected to said lever at a point horizontally spaced from the rotational axis of said lever and a second end pivotally connected to a fixed member horizontally spaced from said rotational axis in a direction opposite said first end whereby movement of said lever causes said articulated structure to pass through a center line through said rotational axis of said lever and said pivotal connection to said fixed member to urge said lever to said first position on one side of said center line and to urge said lever to said second position when on the opposite side of said center line; and means adjacent said rotational axis and disposed on each side of said center line to limit the movement of a portion of said articulated structure, said means being fixed to and movable with said lever.

WILLIAM O. BECHMAN.
PIERCE F. RICHARDSON.

REFERENCES CITED

The following references are of record in the file of this patent:

UNITED STATES PATENTS

| Number | Name | Date |
| --- | --- | --- |
| 1,558,393 | Pringle | Oct. 20, 1925 |
| 1,567,680 | Robinson | Dec. 29, 1925 |
| 1,804,903 | Wemp | May 12, 1931 |
| 1,996,679 | Lepek | Apr. 2, 1935 |

FOREIGN PATENTS

| Number | Country | Date |
| --- | --- | --- |
| 526,660 | Great Britain | Sept. 23, 1940 |